(12) United States Patent
Ariyavisitakul et al.

(10) Patent No.: US 8,472,543 B2
(45) Date of Patent: Jun. 25, 2013

(54) METHOD AND SYSTEM FOR PREDICTING CHANNEL QUALITY INDEX (CQI) VALUES FOR MAXIMUM LIKELIHOOD (ML) DETECTION IN A 2×2 MULTIPLE INPUT MULTIPLE OUTPUT (MIMO) WIRELESS SYSTEM

(75) Inventors: Sirikiat Ariyavisitakul, Alpharetta, GA (US); Eric Ojard, San Francisco, CA (US); Jun Zheng, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1055 days.

(21) Appl. No.: 12/430,286

(22) Filed: Apr. 27, 2009

(65) Prior Publication Data

US 2009/0268833 A1 Oct. 29, 2009

Related U.S. Application Data

(60) Provisional application No. 61/048,011, filed on Apr. 25, 2008.

(51) Int. Cl.
*H04L 23/02* (2006.01)

(52) U.S. Cl.
USPC ........... 375/262; 375/260; 375/267; 375/341; 375/347; 370/203; 370/208; 370/210

(58) Field of Classification Search
USPC ................. 375/144–148, 219, 260, 267, 297, 375/299, 347–349; 455/62, 63.1, 63.4, 67.14, 455/101–103, 105, 106–108, 110, 111, 114.2, 455/115.3; 370/208, 210, 329–334, 342
See application file for complete search history.

(56) References Cited

U.S. PATENT DOCUMENTS

| | | | |
|---|---|---|---|
| 7,054,376 B1 * | 5/2006 | Rubinstain et al. | 375/261 |
| 7,103,325 B1 * | 9/2006 | Jia et al. | 455/101 |
| 2007/0010957 A1 * | 1/2007 | Sampath et al. | 702/57 |
| 2007/0195907 A1 * | 8/2007 | Wang et al. | 375/267 |
| 2008/0080634 A1 * | 4/2008 | Kotecha et al. | 375/267 |
| 2008/0125051 A1 * | 5/2008 | Kim et al. | 455/67.13 |
| 2012/0219093 A1 * | 8/2012 | Jia et al. | 375/308 |

OTHER PUBLICATIONS

International Search Report and Written Opinion for International Patent Application Serial No. PCT/US2009/041788, mailed Jun. 25, 2009.
Notification Concerning Transmittal of International Preliminary Report on Patentability mailed Nov. 4, 2010 in International Application No. PCT/US2009/041788.

(Continued)

*Primary Examiner* — Daniel Washburn
*Assistant Examiner* — Eboni Hughes
(74) *Attorney, Agent, or Firm* — Garlock & Markison; Edward J. Marshall

(57) ABSTRACT

Aspects of a method and system for predicting CQI values for ML detection in a 2×2 MIMO system are presented. In one aspect of the system, a CQI value for a MIMO communication system may be computed based on a computed channel realization by reverse mapping the computed channel realization to a corresponding CQI value. Based on the computed CQI value, a coding rate may be selected. The coding rate may be selected from a lookup table, wherein the computed CQI value is utilized as an index to the lookup table. The reverse mapping may utilize a function, which is computed using radial basis function networks. In another aspect of the system, a joint mutual information value may be computed for the MIMO communication system. The joint mutual information value may be computed based on a Shannon mutual information value and a matched filter mutual information value.

30 Claims, 7 Drawing Sheets

OTHER PUBLICATIONS

"Orthogonal Least Squares Learning Algorithm for Radial, Basic Function Networks," S. Chen, C.F.N. Cowan and P.M. Grant, IEEE Transaction on Neural Networks, vol. 2, No. 2, Mar. 1991, pp. 302-309.

* cited by examiner

METHOD AND SYSTEM FOR PREDICTING CHANNEL QUALITY INDEX (CQI) VALUES FOR MAXIMUM LIKELIHOOD (ML) DETECTION IN A 2×2 MULTIPLE INPUT MULTIPLE OUTPUT (MIMO) WIRELESS SYSTEM

CROSS-REFERENCE TO RELATED APPLICATIONS/INCORPORATION BY REFERENCE

This application makes reference, claims priority to, and claims the benefit of U.S. Application Ser. No. 61/048,011 filed Apr. 25, 2008.

This application makes reference to:
U.S. patent application Ser. No. 12/430,294 filed Apr. 27, 2009; and
U.S. patent application Ser. No. 12/207,721 filed Sep. 10, 2008.

Each of the above stated applications is hereby incorporated herein by reference in its entirety.

FIELD OF THE INVENTION

Certain embodiments of the invention relate to wireless communication. More specifically, certain embodiments of the invention relate to a method and system for predicting channel quality index (CQI) values for maximum likelihood (ML) detection in a 2×2 multiple input multiple output (MIMO) wireless system.

BACKGROUND OF THE INVENTION

Multiple input multiple output (MIMO) systems are wireless communications systems that may transmit signals utilizing a plurality of transmitting antennas, and/or receive signals utilizing a plurality of receiving antennas. Communications between MIMO systems may be based on specifications from the Institute of Electrical and Electronics Engineers (IEEE). A MIMO system that receives a signal Y may compute a channel estimate matrix, H, based on the received signal. The signal may comprise information generated from a plurality of information sources. Each such information source may be referred to as a spatial stream.

A MIMO transmitter may combine spatial streams to generate one or more RF chains. Alternatively, each RF chain may correspond to a distinct spatial stream. A group of RF chains may be concurrently transmitted from the transmitting MIMO system via a plurality of transmitting antennas. The signals concurrently transmitted by the plurality of transmitting antennas, referred to as spatial stream signals, may be represented as a transmitted signal vector X. The spatial stream signals $x_i$ (where i is a spatial stream index variable), which comprise the signal vector X, may propagate across a communication medium en route from the transmitting MIMO system to receiving MIMO system. The signal transfer characteristics of the communication medium may be represented by a channel matrix, H. A receiving MIMO system may utilize a plurality of receiving antennas when receiving the signals. The signals concurrently received by the plurality of receiving antennas may be represented as a received signal vector, R.

The MIMO communication system may be represented mathematically as follows:

$$R = HX + N \qquad [1]$$

where R represents a column vector of signals received by each of a plurality of Nrx receiving antennas: $r_1, r_2, \ldots,$ and $r_{Nrx}$; X represents a column vector of signals transmitted by each of a plurality of Ntx transmitting antennas: $x_1, x_2, \ldots,$ and $x_{Ntx}$; H represents a matrix of channel estimates comprising Nrx rows and Ntx columns; and N represents a column vector of noise received by each of the Nrx receiving antennas: $n_1, n_2, \ldots,$ and $n_{Nrx}$. Statistically, the noise elements, $n_i$, are typically considered to be independent and identically distributed complex Gaussian random variables.

In equation [1] each of the spatial stream signal values $x_i$ may be represented by one or more bits $b_1, b_2, \ldots,$ and $b_{MOD(i)}$. Each spatial stream signal value, which comprises the bits $b_1, b_2, \ldots,$ and $b_{MOD(i)}$, may be referred to as a "symbol". The number of bits MOD(i) in each symbol may be determined based on the modulation type utilized for generating the corresponding spatial stream signal $x_i$ at the MIMO transmitter. Each value for the transmitted signal vector, X, may be represented as comprising the collective bits from the set of concurrently transmitted symbols. The total number of bits represented in vector X is a summation of values MOD(i) for the spatial streams identified by i=1, 2, ..., and Nss.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for predicting channel quality index (CQI) values for maximum likelihood (ML) detection in a 2×2 multiple input multiple output (MIMO) wireless system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for predicting channel quality index (CQI) values for maximum likelihood (ML) detection in a 2×2 multiple input multiple output (MIMO) wireless system. Various embodiments of the invention comprise a method and system for predicting CQI values for a MIMO communication system. The CQI prediction may be utilized at a MIMO transmitter to maximize the rate at which information is transmitted by the MIMO transmitter and successfully received at the MIMO receiver.

In various embodiments of the invention, mutual information computations may be utilized to determine a least upper bound channel capacity for a MIMO receiver system, which utilizes ML detection. The mutual information computations may be performed at a MIMO receiver and/or MIMO transmitter based on a computed channel realization for the communication medium. The mutual information computations may be utilized at a MIMO transmitter to maximize the rate at which information is transmitted by the MIMO transmitter to a MIMO receiver.

Figure 1:
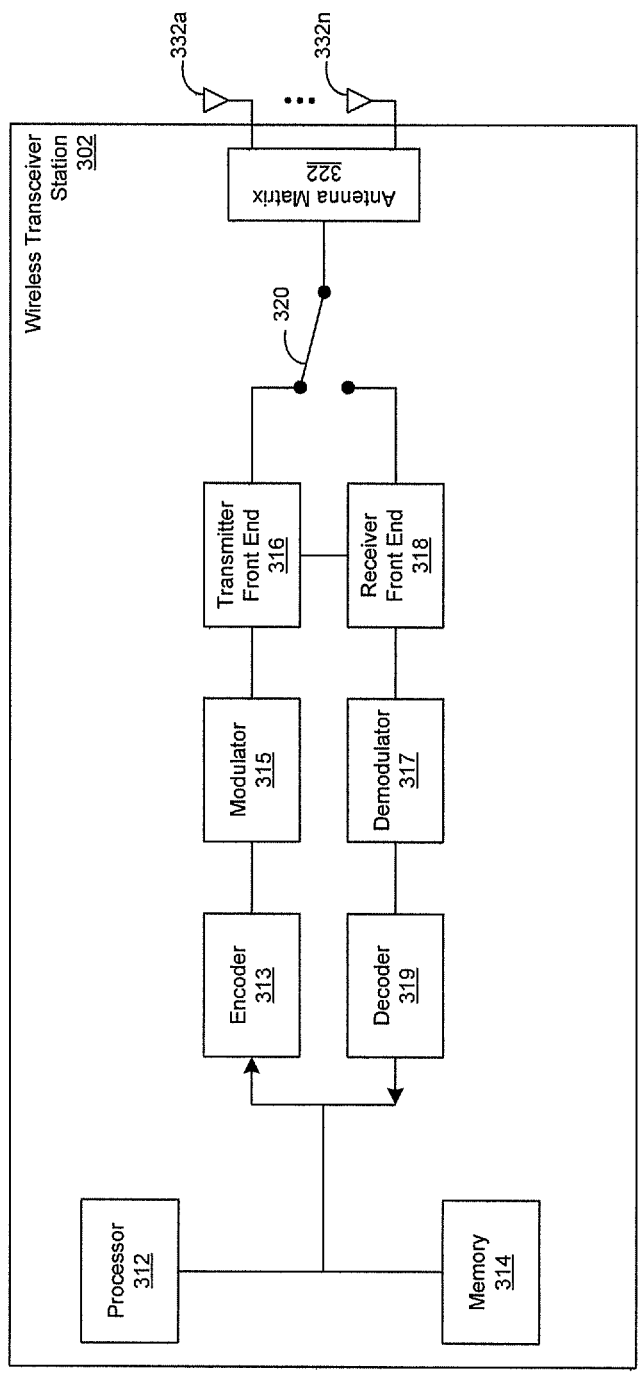
FIG. 1 is an exemplary diagram illustrating a MIMO transceiver system, in accordance with an embodiment of the invention.

FIG. 1 is an exemplary diagram illustrating a MIMO transceiver system, in accordance with an embodiment of the invention. Referring to FIG. 1, there is shown a wireless transceiver station 302 and a plurality of antennas 332a ... 332n. The wireless transceiver station 302 is an exemplary wireless communication device, which may be utilized as a transmitter and/or receiver. The plurality of antennas 332a ... 332n may enable the wireless transceiver station 302 to transmit and/or receive signals, for example radio frequency (RF) signals, via a wireless communication medium. The wireless transceiver station 302 shown in FIG. 1 may also be depicted as comprising one or more transmitting antennas, which are coupled to the transmitter front end (FE) 316 and one or more receiving antennas, which may be coupled to the receiver front end (FE) 318 without loss of generality.

The exemplary wireless transceiver station comprises a processor 312, a memory 314, an encoder 313, a decoder 319, a modulator 315 a transmitter FE 316, a demodulator 317, a receiver FE 318, a transmit and receive (T/R) switch 320 and an antenna matrix 322. The antenna matrix 322 may enable selection of one or more of the antennas 332a ... 332n for transmitting and/or receiving signals at the wireless transceiver station 302. The T/R switch 320 may enable the antenna matrix 322 to be communicatively coupled to the transmitter FE 316 or receiver FE 318.

The transmitter FE 316 may enable the generation of signals, which may be transmitted via the selected antennas 332a ... 332n. The encoder 313 may receive data from the processor 312 and/or memory 314 and generate encoded binary data. The encoded binary data may be generated by utilizing error correction coding, for example binary convolutional coding (BCC), and/or bit interleaving. The modulator 315 may receive encoded binary data from the encoder 313 and convert the encoded binary data to a data symbol representation based on one or more selected modulation types. The modulator 315 may generate one or more spatial streams to transmit the data symbols to the transmitter FE 316.

The receiver FE 318 may enable the processing of signals received via the selected antennas 332a ... 332n. The demodulator 317 may receive data symbols from the receiver FE 318 and enable the generation of a plurality of soft decision values based on one or more selected modulation types. The soft decision values may be sent to the decoder 319. The decoder 319 may utilize the soft decision values to generate decoded binary data. The decoded binary data may be sent to the processor 312 and/or memory 314.

Figure 2:
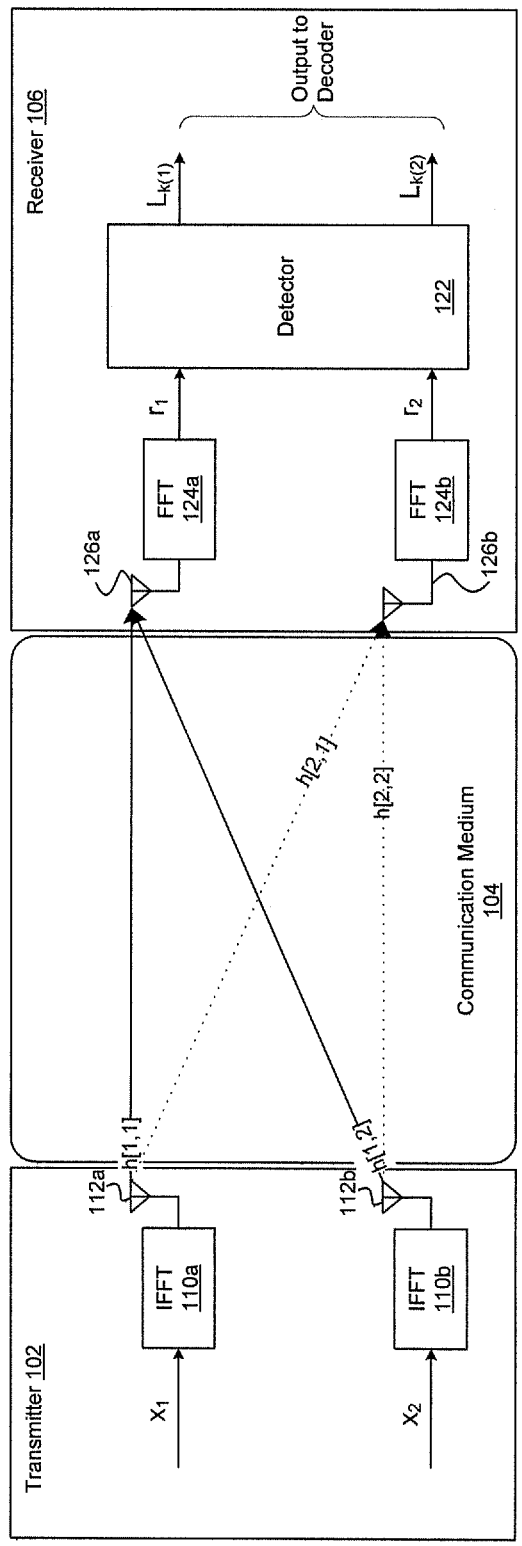
FIG. 2 is an exemplary diagram illustrating a 2×2 MIMO communication system with ML detection, in accordance with an embodiment of the invention.

FIG. 2 is an exemplary diagram illustrating a 2×2 MIMO communication system with ML detection, in accordance with an embodiment of the invention. Referring to FIG. 2, there is shown a MIMO transmitter 102, a MIMO receiver 106, and a communications medium 104. The communications medium 104 may represent a wireless communications medium, for example. The MIMO transmitter 102 may comprise a plurality of inverse fast Fourier transform (IFFT) blocks 110a and 110b, and a plurality of antennas 112a and 112b. The MIMO receiver 106 may comprise a plurality of antennas 126a and 126b, a plurality of fast Fourier transform (FFT) blocks 124a and 124b and a detector block 122.

In an exemplary embodiment of the invention, each of the plurality of IFFT blocks 110a and 110b may receive a corresponding one of a plurality of 2 spatial stream signals $x_1$ and $x_2$. Each of the spatial stream signals may be generated, for example, by a modulator block 315 such as the one shown in FIG. 1, and/or other circuitry which is commonly present in transmitter and/or transceiver systems. Such circuitry may include, for example, parsing circuitry, which distributes bits from a single input bit stream among the plurality of spatial streams, and constellation mapper circuitry, which utilizes a constellation associated with a modulation type to convert groups of bits within a given spatial stream into one of a plurality of signal levels. Each of the IFFT blocks 110a and 110b may convert each of the corresponding spatial stream signals from a frequency domain representation to a time domain representation. Each of the time domain versions of the signals $x_1$ and $x_2$ may be concurrently transmitted by a corresponding one of antennas 110a and 110b. The plurality of concurrently transmitted signals may be represented as a column vector X.

Various embodiments of the invention may also be practiced when the transmitter 102 transmits signals by utilizing beamforming and/or space-time diversity coding. In such instance, the transmitter 102 may comprise a spatial mapping matrix. The spatial mapping matrix may receive a plurality of NSS spatial streams, and output a plurality of NTX transmit chain signals (where NTX refers to the number of transmitting antennas which may be utilized to concurrently transmit signals at the transmitter 102). Each of the transmit chain signals may be generated by computing a weighted sum from the plurality of spatial stream signals, where the weights may be determined by the spatial mapping matrix. Each of the plurality of NTX IFFT blocks may convert each of the corresponding transmit chain signals from a frequency domain representation to a time domain representation. Each of the time domain versions of the transmit chain signals may be transmitted by a corresponding one of the plurality of NTX transmitting antennas. In such case, an effective channel estimate matrix for transmitted signals may be determined based on the product of the channel estimate matrix, which characterizes the communication medium, and the spatial mapping matrix.

Once again referring to FIG. 2, the antennas 126a and 126b may receive signals, $r_1$ and $r_2$, respectively, which propagate via the communication medium 104. The transmitted signal vector X may be altered as it propagates through the communication medium 104. The altered signals may be received at the MIMO receiver as a received signal vector R. The alteration of the transmitted signals may be represented by channel estimates h[i,j]. As shown in FIG. 2, the spatial stream signal $x_1$ which is transmitted by antenna 112a and received at antenna 126a may be altered based on a channel estimate h[1,1]. The spatial stream signal, $x_2$, which is transmitted by antenna 112b and received at antenna 126a may be altered based on a channel estimate h[1,2]. The spatial stream signal, $x_1$, which is transmitted by antenna 112a and received at antenna 126b may be altered based on a channel estimate h[2,1]. The spatial stream signal, $x_2$, which is transmitted by antenna 112b and received at antenna 126b may be altered based on a channel estimate h[2,2].

At the MIMO receiver 106, each of the FFT blocks 124a and 124b may convert a corresponding received signal, $r_1$ and $r_2$, from a time domain representation to a frequency domain representation. The signals received by antennas 126a and 126b may be represented by the following system of equations:

$$r_1 = h[1,1] \cdot x_1 + h[1,2] \cdot x_2 + n_1$$

$$r_2 = h[2,1] \cdot x_1 + h[2,2] \cdot x_2 + n_2 \quad [2]$$

The detector block 122 may enable the MIMO receiver 106 to generate a plurality of soft decision values $L_{k(1)}$ and $L_{k(2)}$. Each of the soft decision values $L_{k(i)}$ corresponds to a soft decision value for the $k^{th}$ bit in the $i^{th}$ spatial stream symbol. The bit corresponding to the soft decision value $L_{k(i)}$ may be represented by the notation $b_{k(i)}$. The set of soft decision values $L_{k(i)}$ may be output from the detector block 122 and received by a decoder, which may utilize the soft decision values to generate decoded bits.

The receiver 106 may comprise functionality not shown in FIG. 2, which is commonly present in receiver and/or transceiver systems. Such circuitry may comprise, for example, decoder circuitry, which generates bit values based on soft decision values and interleaver circuitry, which merges bits from a plurality of spatial streams and/or received RF chains, into a single bit stream.

The maximum quantity of information, which may be transmitted by a MIMO transmitter 102 and received, via communication channel, at a MIMO receiver 106 is referred to as a channel capacity. Channel capacity is typically measured in units of bits/second. Channel capacity may be related to a MIMO channel quality index (CQI) value and/or to a MIMO mutual information value.

CQI represents a quality measure for the communication channel. CQI is typically measured in units of decibels (dB). CQI values are related to signal to noise ratio (SNR) values in the respect that an SNR value may be computed at a MIMO receiver 106 from received signals R (as shown in equation [1]) whereas a CQI value may represent a prediction of an SNR value. The CQI value may be computed based on the channel estimate matrix H. Since the computed channel estimate matrix H is a representation of a communication channel, the matrix H may also be referred to as a channel realization.

Referring to FIG. 2, a 2×2 channel realization matrix H may represent the communication channels h[1,1], h[1,2], h[2,1] and h[2,2]. In an exemplary embodiment of the invention, the MIMO receiver 106 may compute the channel realization matrix H based on signals received from the MIMO transmitter 102. The computed channel realization matrix H may subsequently be communicated to the MIMO transmitter 102. In another exemplary embodiment of the invention, the MIMO transmitter 102 may compute a channel realization matrix H based on signals received from the MIMO receiver 106. In either case, the MIMO transmitter 102 may compute one or more CQI values based on a channel realization matrix H. In addition, the MIMO receiver 106 may compute one or more CQI values based on the channel realization matrix H and communicate the computed CQI value(s) to the MIMO transmitter 102. In various embodiments of the invention, the MIMO transmitter 102 may select one or more coding rates, for subsequent encoding of data in spatial streams $x_1$ and/or $x_2$, based on the computed and/or received CQI value(s).

In an exemplary embodiment of the invention, a processor 312 within the MIMO transmitter 102 may map the 2×2 channel realization matrix H to a plurality of CQI values $q_1$ and $q_2$, where $q_1$ is a CQI value for the first spatial stream, $x_1$, and $q_2$ is a CQI value for the second spatial stream, $x_2$. The CQI value $q_1$ is a CQI value corresponding to the spatial stream $x_1$ at the MIMO transmitter 102 and soft decision value $L_{k(1)}$ at the MIMO receiver 106. Similarly, the CQI value $q_2$ is a CQI value corresponding to the spatial stream $x_2$ at the MIMO transmitter 102 and soft decision value $L_{k(2)}$ at the MIMO receiver 106.

In various embodiments of the invention, the CQI values $q_1$ and $q_2$ may be determined by generating a singular value decomposition of the channel realization matrix H, as shown in the following equation:

$$H = USV^H \quad [3]$$

where the matrix of singular values, S, may be represented as shown in the following equation:

$$S = \begin{bmatrix} s_1 & 0 \\ 0 & s_2 \end{bmatrix} \quad [4a]$$

and the unitary matrix, V, may be represented as shown in the following equation:

$$V = \begin{bmatrix} 1 & 0 \\ 0 & e^{-j\theta} \end{bmatrix} \cdot \begin{bmatrix} \cos\phi & -\sin\phi \\ \sin\phi & \cos\phi \end{bmatrix} \quad [4b]$$

where $\theta$ and $\phi$ represent angles.

The CQI values $q_1$ and $q_2$ may be represented as functions of the singular values $s_1$ and $s_2$, and of the angles $\theta$ and $\phi$: $q_1(s_1,s_2,\theta,\phi)$ and $q_2(s_1,s_2,\theta,\phi)$. The CQI values for a given CQI function $q_i(s_1,s_2,\theta,\phi)$ may reflect symmetries based on the parameters $\theta$ and $\phi$ as shown in the following equations:

$$q_i(s_1, s_2, \theta, \phi) = q_i\left(s_1, s_2, \theta + \frac{\pi}{2}, \phi\right) \quad [5]$$

$$q_i(s_1, s_2, \theta, \phi) = q_i\left(s_1, s_2, \frac{\pi}{2} - \theta, \phi\right)$$

$$q_i(s_1, s_2, \theta, \phi) = q_i(s_1, s_2, \theta, \phi + \pi)$$

$$q_i(s_1, s_2, \theta, \phi) = q_i(s_1, s_2, \theta, \pi - \phi)$$

In addition, the relationship between the CQI values $q_1(s_1,s_2,\theta,\phi)$ and $q_2(s_1,s_2,\theta,\phi)$ may be represented as shown in the following equation:

$$q_2(s_1, s_2, \theta, \phi) = q_1\left(s_1, s_2, \frac{\pi}{2} - \theta, \frac{\pi}{2} - \phi\right) \quad [6]$$

Consequently, given a CQI value $q_1(s_1,s_2,\theta,\phi)$, for example, the other CQI value, for example $q_2(s_1,s_2,\theta,\phi)$, may be computed based on equation [6]. Accordingly, based on the symmetrical relationships shown in equations [5] and [6], values for the parameter $\theta$ may be limited to $$\theta \in [0, \frac{\pi}{4}]$$

while values for the parameter $\phi$ may be limited to $$\phi \in [0, \frac{\pi}{2}].$$

Various embodiments of the invention comprise a method and system for predicting CQI values for a MIMO communication system. The CQI prediction may be utilized at a MIMO transmitter 102 to maximize the rate at which information is transmitted by the MIMO transmitter 102 and successfully received at the MIMO receiver 106.

In a MIMO communication system, channel capacity represents the maximum rate at which information is transmitted by a MIMO transmitter 102 and successfully received by a MIMO receiver 106. Information is successfully received when the information encoded in transmitted signals X at the MIMO transmitter 102 are detected from received signals R at the MIMO receiver 106. Information may be unsuccessfully received when bit errors are detected in the received signals. The successful rate of information reception at the MIMO receiver 106 may be referred to as information throughput. The channel capacity value corresponds to a maximum information throughput value.

Based on, for example, preamble information in the received signals, the MIMO receiver 106 may compute a channel realization matrix H. Based on the computed channel realization matrix H and on detected information in the received signals, the MIMO receiver 106 may compute a channel quality measure, CQI(H). The computed CQI(H) may correspond to a rate at which bit errors are detected in the received signals. This rate, which is referred to as a bit error rate (BER), represents the number of bit errors detected among a given number of bits detected from the received signals. A rate for transmitted packets is referred to a packet error rate (PER). Accordingly, the PER for a MIMO communication system may be represented as a function of the channel realization H: PER(H).

To enable a MIMO receiver 106 to detect when a bit error occurs, the information, which is transmitted by a MIMO transmitter 102, is typically transmitted with additional data, which may be utilized at a MIMO receiver 106 to detect and/or correct bit errors in the information detected from the received signals. The additional data typically comprises forward error correction (FEC) coding (or inner coding, for example) data. Examples of inner codes comprise block convolutional codes (BCC) and turbo codes. The ratio of the number of information bits, $i_b$, to the total transmitted bits, $t_b$, (which include information and FEC data), is referred to as a coding rate, $r_c$. The information and additional data may be collectively referred to as encoded information.

The rate at which encoded information is transmitted by a MIMO transmitter 102, as measured in bits/second, may be determined based on the aggregate rate at which symbols are transmitted, $r_{sym}$. Accordingly, by increasing the number of bits represented by each transmitted symbol, MOD(i) (where i represents a spatial stream index value for which i∈(1, 2)), the encoded information transmission rate may be increased. However, increasing MOD(i) at the MIMO transmitter 102 may result in an increase the BER as observed at the MIMO receiver. This may reduce information throughput.

Increasing the number of FEC data bits transmitted by the MIMO transmitter may increase the ability of the MIMO receiver to detect and/or correct bit errors in detected information. However, while increasing the number of FEC data bits may not change the encoded information transmission rate, the increased number of FEC data bits may reduce the coding rate. The reduction in the coding rate may correspond to a reduction in the information transfer rate, which refers to the effective transmission rate for unencoded information. This, in turn, may reduce the information throughput rate at the MIMO receiver.

Thus, given a modulation type, or value MOD(i) for the $i^{th}$ spatial stream (where i=1 or i=2) in a 2×2 MIMO system, maximizing the information throughput rate at the MIMO receiver 106 may depend upon the selection of a coding rate, $r_c(i)$, at the MIMO transmitter 102. In various embodiments of the invention, the selected coding rate $r_c(1)$ may be determined based on a computed CQI value for the $1^{st}$ spatial stream in the 2×2 MIMO system, $q_1$. The coding rate $r_c(1)$ may be determined from a lookup table (LUT), where the computed CQI value $q_1$ may be utilized as an index value for selecting the coding rate $r_c(1)$ from the LUT. Once the CQI value $q_1$ has been computed, a CQI value, $q_2$, which corresponds to the $2^{nd}$ spatial stream in the 2×2 MIMO system may be computed as shown in equation [6]. One the CQI value $q_2$ has been computed, a corresponding coding rate $r_c(2)$ may be selected.

In various embodiments of the invention, the CQI values for the MIMO communication system may be predicted based on corresponding CQI values for a SISO communication system. Accordingly, the CQI values for the MIMO communication system, $q_1$ and $q_2$, may be computed by approximating the 2×2 MIMO system shown in FIG. 2 as two independent single input single output (SISO) communication systems. With reference to FIG. 2, an exemplary SISO communication system may comprise a SISO transmitter, which comprises a single transmitting antenna, for example transmitting antenna 112a, and a SISO receiver may comprise a single receiving antenna, for example receiving antenna 126a. The SISO transmitter may utilize the single transmitting antenna to transmit data from a single spatial stream, for example spatial stream $x_1$. The SISO receiver may utilize the single receiving antenna to receive a single signal $r_1$. The relationship between the transmitted spatial stream signal from the SISO transmitter $x_{SISO}$ and received signal $r_{SISO}$ at the SISO receiver may be represented as shown in the following equation:

$$r_{SISO} = h_{SISO} \cdot x_{SISO} + n_{AWGN} \qquad [7]$$

where $h_{SISO}$ represents the channel realization for a SISO communication channel and $n_{AWGN}$ represents additive white Gaussian distributed noise. The received signal $r_1$ may be detected by a detector, for example the detector 122, to generate soft decision values $L_{k(1)}$. The CQI value for the SISO communication system may be referred to as $q_{SISO}$.

In various embodiments of the invention, a mapping between the CQI value, CQI(H), for the MIMO system, and the CQI value, $q_{SISO}$, for the SISO system may be represented as shown in the following equation:

$$PER_{MIMO, x_1}(H) = PER_{SISO}(q_{SISO}) \qquad [8]$$

where $$PER_{MIMO, x_1}(H)$$

represents the PER as a function of the MIMO channel realization H for spatial stream $x_1$ and $$PER_{SISO}(q_{SISO})$$

represents the PER as a function of the SISO CQI value $q_{SISO}$.

Figure 3:
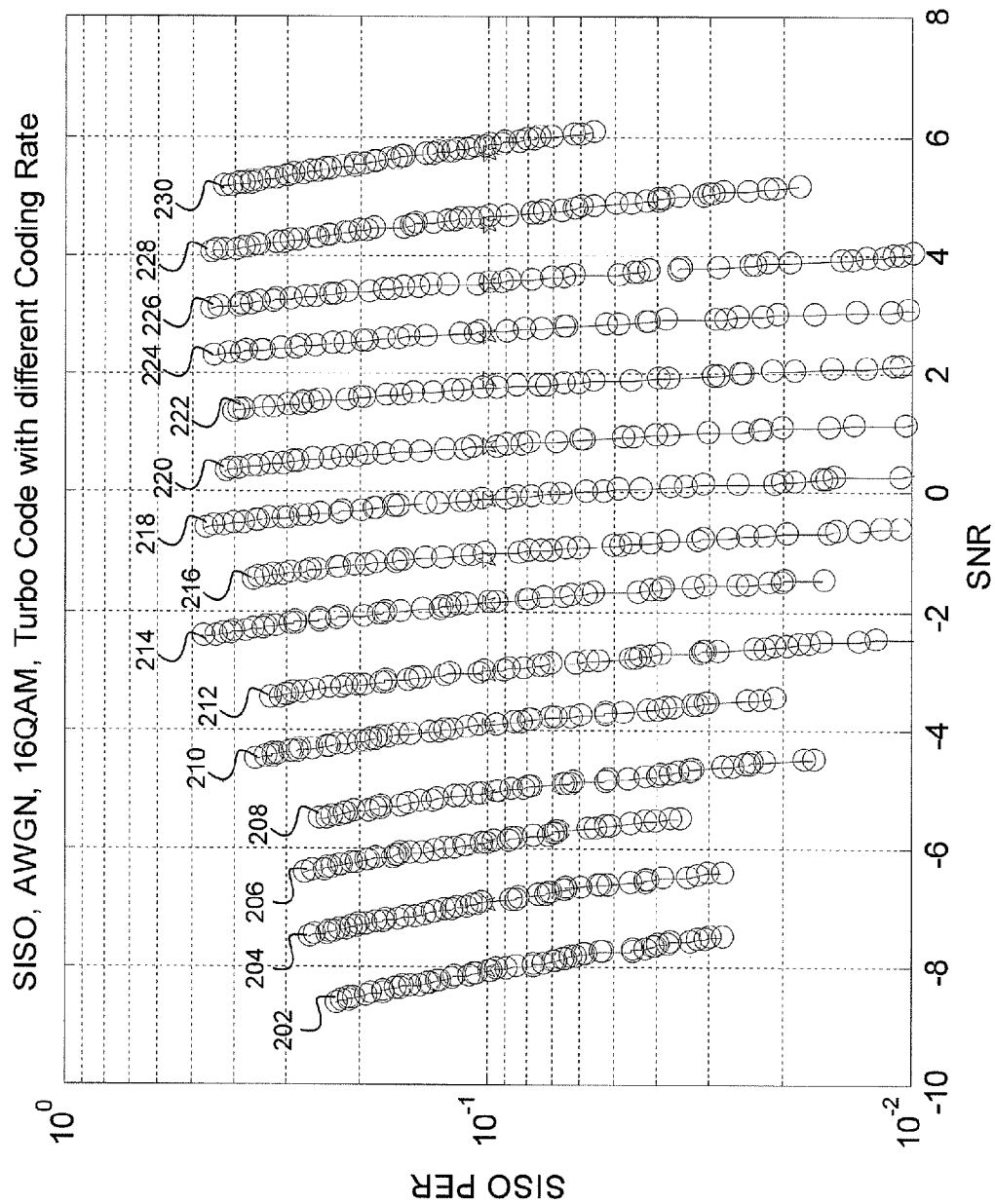
FIG. 3 is a graph that presents PER values as a function of SNR for an exemplary SISO communication system, in accordance with an embodiment of the invention.

FIG. 3 is a graph that presents PER values as a function of SNR for an exemplary SISO communication system, in accordance with an embodiment of the invention. FIG. 3 presents a graphical representation of $$PER_{SISO}(q_{SISO})$$

versus SISO CQI values $q_{SISO}$. Referring to FIG. 3, there is shown a plurality of PER curves 202, 204, 206, 208, 210, 212, 214, 216, 218, 220, 222, 224, 226, 228 and 230. Each of the PER curves corresponds to a distinct coding rate, $r_c$. Each of the PER curves comprises a plurality of sample values, which were computed for an exemplary SISO communication system for which the modulation type is 16-level quaternary amplitude modulation (16-QAM), the inner code method is a turbo code, and noise is AWGN distributed. The SNR values shown in FIG. 3 correspond to values for $q_{SISO}$. Based on FIG. 3, for a given SNR value and PER value, a coding rate may be selected, which may be utilized in a SISO system that utilizes turbo coding and a 16-QAM modulation type.

While FIG. 3 presents PER curves for a 16-QAM modulation type, various embodiments of the invention are not so limited and may be practiced in connection with other modulation types, for example 64-QAM, 256-QAM or 1024-QAM. Similarly, various embodiments of the invention may be practiced in connection with FEC code types other than turbo coding, for example BCC.

Based on equation [8], the value $q_{SISO}$ may be represented as shown in the following equation:

$$q_{SISO} = PER_{SISO}^{-1}\left(PER_{MIMO,x_1}(H)\right) \quad [9]$$

where $f^{-1}(g(x))$ represents an reverse mapping of the function $g(X)$ based on the function f. In other words, equation [9] presents a mapping between the SISO CQI $q_{SISO}$ and the PER for the spatial stream $x_1$ in the MIMO communication system.

In an exemplary embodiment of the invention, equation [9], and the plurality of SISO PER curves 202, 204, 206, 208, 210, 212, 214, 216, 218, 220, 222, 224, 226, 228 and 230 (FIG. 3), may be utilized to establish a correspondence between PER values $$PER_{MIMO,x_1}(H)$$

for a MIMO system and the CQI values $q_{SISO}$ for a SISO system.

In various embodiments of the invention, a plurality of channel realization values $H_n$ may be generated for $1 \leq n \leq N_{sample}$ where $N_{sample}$ represents the number of channel realizations generated in a sample set. For each generated channel realization, $H_n$, a corresponding coding rate value, $r_{c,n}$, may be selected for information transmitted by a MIMO transmitter 102. The MIMO transmitter 102 may transmit signals to a MIMO receiver 106. At the MIMO receiver 106, a corresponding PER value for spatial stream $x_1$, $$PER_{MIMO,x_1}(H_n),$$

may be computed based on the received signals. Based on the selected coding rate $r_{c,n}$ for the MIMO system, a corresponding SISO curve 202, 204, 206, 208, 210, 212, 214, 216, 218, 220, 222, 224, 226, 228 or 230 may be selected in FIG. 3, for example. Based on the computed value $$PER_{MIMO,x_1}(H_n)$$

a corresponding SISO PER value may be selected in FIG. 3, for example. Based on the selected SISO PER value and the selected coding rate $r_{c,n}$, a corresponding SISO SNR value may be selected in FIG. 3, for example. A value $q_{SISO,n}$ may correspond to the selected SISO SNR value.

In various embodiments of the invention, each computed PER value $$PER_{MIMO,x_1}(H_n)$$

corresponds to a channel realization $H_n$. Accordingly, once the association between the computed value $$PER_{MIMO,x_1}(H_n)$$

and the selected SISO SNR value qSISO,n is established, there is a corresponding association between the channel realization $H_n$ and the selected SISO SNR value $q_{SISO,n}$. Consequently, a plurality of ($q_{SISO,n}$,$H_n$) tuples may be generated. Each tuple ($q_{SISO,n}$,$H_n$) may be stored in a memory 314 (FIG. 1). The plurality of channel realization samples $H_n$ may be represented as a vector, X.

In various embodiments of the invention, the reverse mapping function shown in equation [9] may be generated based on the plurality of tuple values ($q_{SISO,n}$,$H_n$) by utilizing radial basis function (RBF) networks. In an exemplary embodiment of the invention, an reverse mapping function, f(X), may be computed as shown in the following equation:

$$f(X) = \lambda_0 + \sum_{i=1}^{n_r} \lambda_1 \cdot \phi(\|X - c_i\|) \quad [10]$$

where values X correspond to sample values $H_n$, values f(X) correspond to values $q_{SISO,n}$, $c_i$ represents RBF center values, $n_r$ represents the number of RBF center values, $\lambda_0$ and $\lambda_i$ represent weighting coefficients and $\phi(v)$ represents an RBF basis function. The notation $\|v\|$ represents a Euclidean norm computation. In an exemplary embodiment of the invention, the RBF basis function may utilize a Gaussian basis function, which may be represented as shown in the following equation:

$$\phi(v) = \exp(-v^2/\beta^2) \quad [11]$$

where $\beta$ may represent a constant value, for example $\beta=3.5$.

In an exemplary embodiment of the invention, the RBF center values, $c_i$, may be selected from the plurality of sample values $H_n$. Values for the weighting coefficients $\lambda_0$ and $\lambda_i$ may be computed by utilizing an orthogonal least square learning algorithm.

In various embodiments of the invention, the function f(X), which is computed using RBF networks as shown in equation [10], may be utilized for CQI prediction in a MIMO receiver 106 with ML detection. A processor 312, which is utilized in connection with a MIMO receiver 106, may compute a channel realization H based on signals received at the MIMO receiver 106. In an exemplary embodiment of the invention, the MIMO receiver 106 may communicate the computed channel realization H to the MIMO transmitter 102. A processor 312, which is utilized in connection with the MIMO transmitter 102, may use the reverse mapping function f(X), as computed in equation [10], and the received channel realization H to determine a CQI value, $q_1$, which corresponds to the spatial stream $x_1$. Once a CQI value $q_1$ is determined, a corresponding CQI value, $q_2$, which corresponds to the spatial stream $x_2$, may be determined as shown in equation [6]. Based on the determined CQI value(s) $q_1$ and/or $q_2$, the processor 312, which is utilized in connection with the MIMO transmitter 102, may select coding rates $r_c(1)$ and $r_c(2)$ for spatial streams $x_1$ and $x_2$, respectively. In an exemplary embodiment of the invention, a lookup table (LUT) may be utilized to select a coding rate $r_c(i)$ and/or modulation type (identified based on a MOD(i) value, for example) for an $i^{th}$ spatial stream (where i=1 or i=2). The MIMO transmitter 102 may utilize the selected coding rates to generate subsequent encoded information, which may be transmitted from the MIMO transmitter 102 to the MIMO receiver 106 via the communication medium 104. In various embodiments of the invention, the selected coding rates may enable the MIMO transmitter 102 to maximize information throughput at the MIMO receiver 106 for a given channel realization H, which represents signal transmission characteristics of the communication medium 104.

In other exemplary embodiments of the invention, a processor 312, which is utilized in connection with the MIMO receiver 106, may compute CQI values $q_1$ and/or $q_2$ substantially as described above. The processor 312, which is utilized in connection with the MIMO receiver 106, may select coding rates $r_c(1)$ and/or $r_c(2)$. The computed CQI values $q_1$ and/or $q_2$, and/or selected coding rates $r_c(1)$ and/or $r_c(2)$, may be communicated by the MIMO receiver 106 to the MIMO transmitter 102. The MIMO transmitter 102 may utilize the received CQI and/or coding rate values to transmit subsequent signals to the MIMO receiver 106.

In an exemplary embodiment of the invention, the processor 312, which is utilized in connection with the transmitter 102, may precode transmitted spatial streams $x_1$ and $x_2$ (represented, for example, by a spatial stream vector X) based on a preceding matrix V as shown in equation [4b]. The precoding matrix V may be computed based on a singular value decomposition of a channel realization H. A processor 312, which is utilized in connection with the MIMO receiver 106, may filter received spatial stream signals $r_1$ and $r_2$ (represented, for example, by a received signal vector R) based on a filtering matrix $U^H$. The filtering matrix, $U^H$, may represent a complex conjugate (or Hermitian) transform version of the matrix U shown in equation [4a]. The matrix U may be computed based on a channel realization H. The processor 312, which is utilized in connection with the MIMO receiver 106, may compute a channel realization matrix H based on a plurality of spatial stream signals, which are concurrently received via a plurality of receiving antennas 126a and 126b. The processor 312, which is utilized in connection with the MIMO transmitter 102, may compute a channel realization matrix H based on signals received from the MIMO receiver 106 and/or based on information communicated to the MIMO transmitter 102 via the received signals.

After filtering of received signals at the MIMO receiver 106 by the filtering matrix $U^H$, the processor 312, which is utilized in connection with the MIMO receiver 106, may determine the value of the singular value $s_1$, which is associated with the first spatial stream, and the singular value $s_2$, which is associated with the second spatial stream.

The processor 312, which is utilized in connection with the MIMO receiver 106, may compute the CQI value $q_1$, associated with the first spatial stream, based on the reverse mapping function $f(X=s_1)$ (equation [10]) for the singular value $s_1$. Accordingly, the MIMO receiver 106, may compute the CQI value $q_2$, associated with the second spatial stream, based on the reverse mapping function $f(X=s_2)$ for the singular value $s_2$. Based on the CQI values $q_1$ and $q_1$, coding rates $r_c(1)$ and $r_c(2)$, respectively, may be selected. In an exemplary embodiment of the invention, the coding rates $r_c(1)$ and $r_c(2)$ may be selected from an LUT based on the corresponding CQI values $q_1$ and $q_1$.

In various embodiments of the invention, information throughput at a MIMO receiver 106 may be maximized based on mutual information computations for a MIMO communication system. Mutual information is a quantity, which attempts to measure the statistical mutual dependence between two variables. For example, referring to equation [1] in the context of a MIMO communication system, mutual information between the transmitted signals X and received signals R, may provide an indication of the extent to which a received signal R may be considered to be a reliable representation of the transmitted signal X. The mutual information between X and R, I(X,R), may be represented as shown in the following equation:

$$I(X,R) = Q(R) - Q(R|X) \quad [12]$$

where Q(R) represents the entropy of R and Q(R|X) represents the conditional entropy of R for a given value X. The entropy value Q(R) may also be referred to as a self-information value and may be represented as shown in the following equation:

$$Q(R) = -\sum_R p_R \cdot \log_2(p_R) \quad [13]$$

where $p_R$ represents a probability density distribution for values of R. The conditional entropy value H(R|X) may be represented as shown in the following equation:

$$Q(R|X) = -\sum_R p_{R|X} \cdot \log_2(p_{R|X}) \quad [14]$$

where $p_{R|X}$ represents a conditional probability density distribution for values of R for a given value X. The conditional probability density $p_{R|X}$ may be represented as shown in the following equation:

$$p_{R|X} = \frac{p_{X,R}}{p_X} \quad [15]$$

where $p_{X,R}$ represents the joint probability density distribution for values of X and R and $p_X$ represents the probability density distribution for values of X. The joint probability density $p_{X,R}$ may be determined based on the channel realization H. Accordingly, the mutual information value I(X,R) may be determined based on the channel realization H.

For a given mutual information value I(X,R), a capacity value, C, may be computed for the communication channel as shown in the following equation:

$$C = \sup_{p_X}[I(X, R)] \quad [16]$$

where sup[z] refers to a least upper bound value, or supremum. As shown in equation [15], the value C represents the least value which is greater than or equal to the greatest value I(X,R), which may be determined based on the range of values within the probability density distribution $p_X$. Accordingly, the channel capacity is maximized when the mutual information is maximized. The maximum theoretical channel capacity for a given communication channel is referred to as the Shannon capacity, $C_{Shannon}$, which may be computed as shown in the following equation:

$$C_{Shannon} = \log_2\left|I + \frac{H^H H}{NSS \cdot \sigma^2}\right| \quad [17a]$$

where I represents an identity matrix, NSS represents the number of spatial streams utilized in the MIMO communication system, $\sigma$ represents the standard deviation for channel noise, n (equation [1]), H represents a channel realization matrix and $H^H$ represents a complex conjugate transformed version of the matrix H. The normalized Shannon upper bound on mutual information, $I_{Shannon}$, is represented in the following equation:

$$I_{Shannon} = \frac{C_{Shannon}}{2 \cdot \log_2 M} \quad [17b]$$

where M represents the number of levels per dimension for a given modulation type; for example, for a 16-QAM modulation type, M=4.

Figure 4:
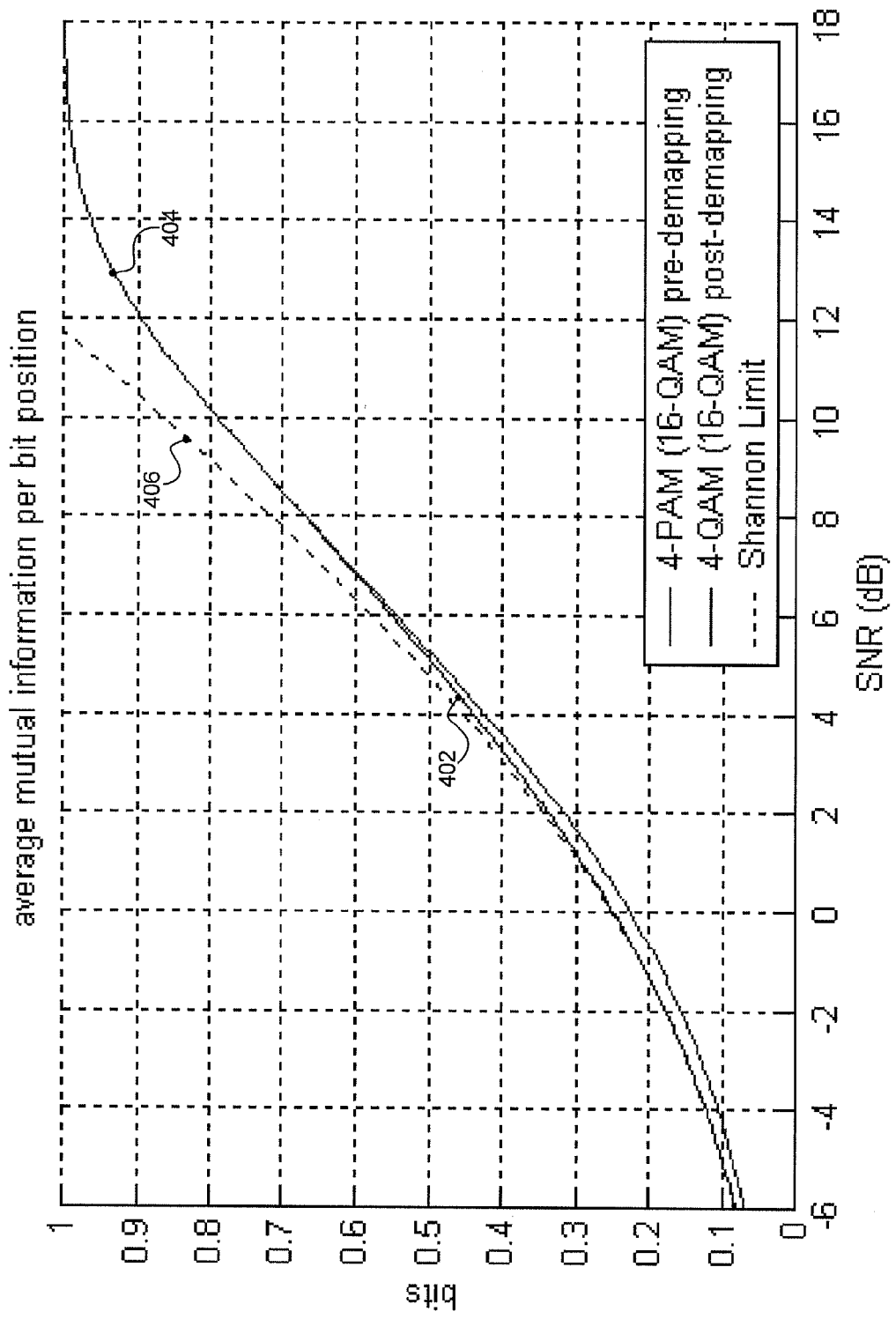
FIG. 4 is a graph that presents average mutual information per detected bit as a function of SNR, in accordance with an embodiment of the invention.

FIG. 4 is a graph that presents average mutual information per detected bit as a function of SNR, in accordance with an embodiment of the invention. FIG. 4 presents average mutual information per detected bit for an ML detector 122 (FIG. 2), which is utilized in connection with the MIMO receiver 106. The average mutual information is presented in FIG. 4 in units of bits as a function of SNR value. Referring to FIG. 4, there is shown a plurality of mutual information curves 402, 404 and 406. For each mutual information curve, a 16-QAM modulation type is utilized. A 16-level QAM corresponds to a 4-level pulse amplitude modulation (4-PAM) per dimension. Mutual information curve 402 represents average mutual information per bit, which is computed prior to demapping of the detected symbols into bits for 4-PAM. Mutual information curve 402 is shown in FIG. 4 as a function of an SNR value and is represented by a function $g_M$(SNR). Mutual information curve 404 represents average mutual information per bit, which is computed subsequent to demapping of the detected symbols into bits for 4-PAM. Mutual information curve 404 is shown in FIG. 4 as a function of an SNR value and is represented by a function $g_M'$(SNR). Mutual information curve 406 represents the Shannon limit average mutual information per bit.

In various embodiments of the invention a detector 122 for ML detection may utilize a matched filter when processing a received signal vector R (equation [1]) to enable generation of the soft decision values $L_{k(1)}$ and/or $L_{k(2)}$. In an exemplary embodiment of the invention, the detector 122 may utilize a matched filter, $W_1$, to enable generation of the soft decision values $L_{k(1)}$. The matched filter $W_1$ may be represented as a unity matrix such that the product of the matched filter $W_1$ and the channel realization matrix H is a triangular matrix as shown in the following equations:

$$W_1 H = \begin{bmatrix} a & 0 \\ b & c \end{bmatrix} \quad [18]$$

where a, b and c are coefficients in the triangular matrix and:

$$W_1^H W_1 = \begin{bmatrix} 1 & 0 \\ 0 & 1 \end{bmatrix} \quad [19]$$

The triangular matrix, which may result from processing of the received signal vector R by the matched filter $W_1$ may enable detection of a first spatial stream from the received signal vector R, and subsequent generation of the soft decision values $L_{k(1)}$, based on ML detection methods. Subsequent to detection of the first spatial stream, the second spatial stream may be detected based on successive interference cancellation (SIC) methods.

In various embodiments of the invention a mutual information least upper bound value may be determined, as a function of an SNR value, for a 2×2 MIMO system in which the MIMO receiver 106 utilizes ML for detection of the first spatial stream, and SIC for ML detection of the second spatial stream. This least upper bound value, $I_{ML-SIC(1)}$, may be determined as shown in the following equation:

$$I_{ML} \leq I_{ML-SIC(1)} \equiv \frac{C_{Shannon}}{2 \cdot \log_2 M} - g_M \cdot \left(\frac{c^2}{\sigma^2}\right) \quad [20]$$

where $I_{ML}$ represents mutual information for ML detection for a first spatial stream and $I_{ML-SIC(1)}$ represents mutual information for ML detection for a second spatial stream subsequent cancellation of the first spatial stream. $C_{Shannon}$ represents the Shannon capacity (equation [17a]), M represents the number of levels per dimension for a given modulation type, $g_M$ represents the average mutual information, which is computed prior to demapping (FIG. 4, curve 402), c represents a coefficient in the triangular matrix shown in equation [18] and $\sigma^2$ represents the standard deviation for channel noise power (equation [1]).

Referring to equation [20], the upper limit value for $I_{ML}$ may be equal to the Shannon limit value, $I_{Shannon}$ (equation [17b]). The first term on the right hand side of equation [20] represents the Shannon upper bound mutual information value. The ratio $$\left(\frac{c^2}{\sigma^2}\right)$$

represents a matched filter SNR value. Accordingly, the multiplicative product $$g_M \cdot \left(\frac{c^2}{\sigma^2}\right)$$

corresponds to a mutual information value associated with the matched filter.

In various embodiments of the invention, a least upper bound value for mutual information in a 2×2 MIMO communication system may be determined to be less than the Shannon upper bound value by an amount that is at least equal to the mutual information value associated with the matched filter. In other words, for a MIMO receiver 106 with ML detection, which utilizes a matched filter, the least upper bound value for mutual information of the first detected spatial stream in a 2×2 MIMO communication system may be equal to the Shannon upper limit mutual information value minus a mutual information value associated with the matched filter, which is utilized for detection of the second spatial stream.

In various embodiments of the invention, a channel capacity value, $C_{ML\text{-}SIC(1)}$, may be computed based on the least upper bound mutual information value $I_{ML\text{-}SIC(1)}$ as computed in equation [20]. Based on the computed value $C_{ML\text{-}SIC(1)}$ coding rates $r_{c(1)}$ and $r_{c(2)}$ may be selected at a MIMO transmitter 102 for maximum information throughput at a MIMO receiver 106. In an exemplary embodiment of the invention, the coding rates $r_{c(1)}$ and $r_{c(2)}$ may be selected from an LUT based on the computed mutual information value $I_{ML\text{-}SIC(1)}$ (equation [20]).

Figure 5:
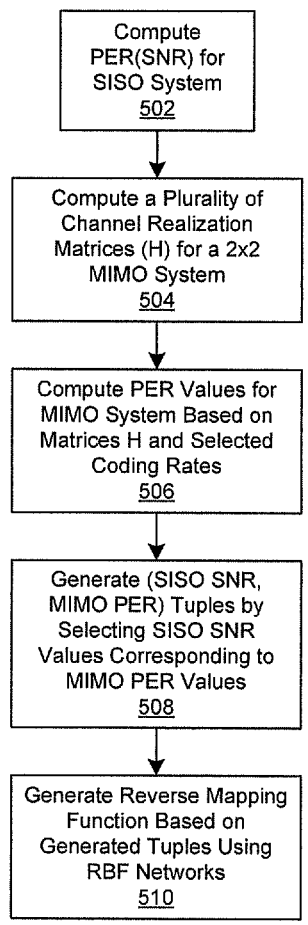
FIG. 5 is a flowchart illustrating exemplary steps for generating a reverse mapping function utilizing radial basis function networks, in accordance with an embodiment of the invention.

FIG. 5 is a flowchart illustrating exemplary steps for generating a reverse mapping function utilizing radial basis function networks, in accordance with an embodiment of the invention. Referring to FIG. 5, in step 502, a processor 312 may be utilized to compute a plurality of packet error rate (PER) values as a function of SNR for a SISO communication system. The PER values may be computed based on a plurality of selected coding rate values. The plurality of PER values and SNR values may be stored in a memory 314.

In step 504, the processor 312 may be utilized to compute a plurality of channel realization matrices (H) for a 2×2 MIMO communication system. In step 506, the processor 312 may be utilized select one or more coding rates and to compute a plurality of PER values for a 2×2 MIMO communication system based on the selected coding rate(s) and on the computed channel realization matrices. In an exemplary embodiment of the invention, the computed MIMO PER values may be associated with a selected spatial stream in the 2×2 MIMO communication system, for example the first spatial stream, $x_1$. The plurality of PER values for the 2×2 MIMO communication system may be stored in the memory 314.

In step 508, the processor 312 may be utilized to associate individual MIMO PER values with corresponding SISO SNR values by selecting a SISO SNR value that corresponds to a MIMO PER value based on a selected coding rate. The processor may generate a plurality of tuples, each comprising a MIMO channel realization matrix (H) and corresponding SISO SNR value based on the selected coding rate. In step 510, the processor 312 may utilize the generated tuples to generate a reverse mapping function using RBF networks.

Figure 6:
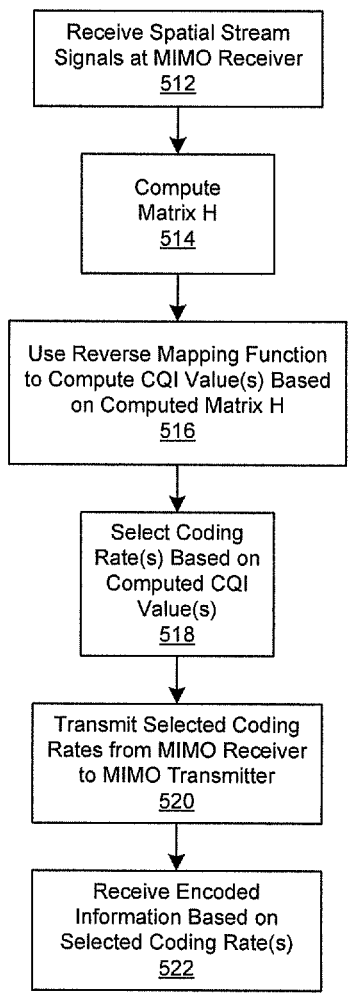
FIG. 6 is a flowchart illustrating exemplary steps for CQI prediction utilizing radial basis function networks, in accordance with an embodiment of the invention.

FIG. 6 is a flowchart illustrating exemplary steps for CQI prediction utilizing radial basis function networks, in accordance with an embodiment of the invention. In FIG. 6, the reverse mapping function, as described in FIG. 5 for example, may be utilized for CQI prediction. In step 512, a MIMO receiver 106 may receive spatial stream signals from a MIMO transmitter 102. In step 514, the MIMO receiver 106 may compute a channel realization matrix that characterizes a communication medium 104, which is utilized for communication between the MIMO transmitter 102 and the MIMO receiver 106.

In step 516, the processor 312, which is utilized in connection with the MIMO receiver 106, may utilize the generated reverse mapping function to compute one or more corresponding CQI values, $q_1$ and $q_1$, based on the computed channel realization matrix. In step 518, the processor 312 may select one or more coding rates based on the computed CQI value(s). In step 520, the MIMO receiver 106 may transmit the selected coding rates to the MIMO transmitter 102. In step 522, the MIMO receiver 106 may subsequently receive encoded information based on the selected coding rate.

Figure 7:
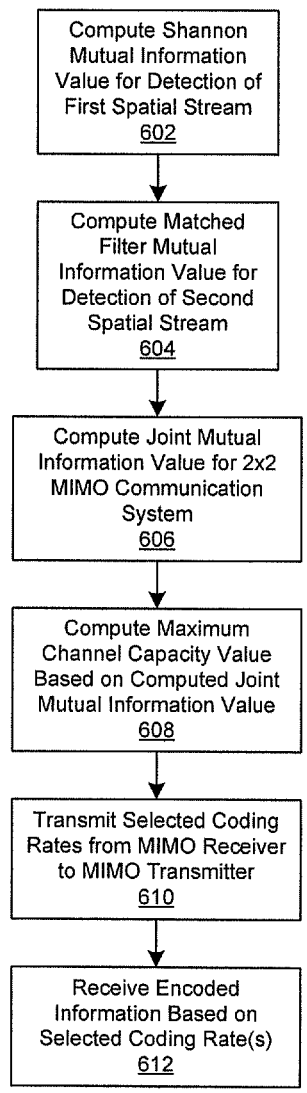
FIG. 7 is a flowchart illustrating exemplary steps for CQI prediction utilizing mutual information, in accordance with an embodiment of the invention.

FIG. 7 is a flowchart illustrating exemplary steps for CQI prediction utilizing mutual information, in accordance with an embodiment of the invention. Referring to FIG. 6, in step 602, a processor 312 may be utilized to compute a Shannon upper limit mutual information value for detection of a first spatial stream at a MIMO receiver 106 with ML detection. In step 604, the processor 312 may be utilized to compute a mutual information value for a matched filter, which is utilized for detection of a second spatial stream at the MIMO receiver 106. The matched filter mutual information value may be determined based on an SNR value for the matched filter subsequent to cancellation, utilizing SIC, of the first spatial stream. In step 606, the processor 312 may be utilized to compute a joint mutual information value for a 2×2 MIMO communication system based on the Shannon upper limit mutual information value and the matched filter mutual information value. In step 608, the processor 312 may select one or more coding rates based on the computed joint mutual information value. In step 610, the MIMO receiver 106 may transmit the selected coding rates to the MIMO transmitter 102. In step 612, the MIMO receiver 106 may subsequently receive encoded information based on the selected coding rate.

In various embodiments of the invention, coding rates $r_{c(1)}$ and $r_{c(2)}$ selected based on the reverse mapping function (as shown in equation [10], for example) may be adjusted based on the computed joint mutual information value $I_{ML\text{-}SIC(1)}$ (as computed in equation [20], for example). Based on the coding rates $r_{c(1)}$ and $r_{c(2)}$ as selected based on the reverse mapping function a processor 312, which, in an exemplary embodiment of the invention, is utilized in connection with the MIMO receiver 106, may compute an aggregate data transfer rate for signals concurrently transmitted by the MIMO transmitter 102, $C_{TX}(r_c(1), r_c(2))$. The processor 312 may adjust values for $r_c(1)$ and/or $r_c(2)$ based on the following condition:

$$C_{TX}(r_c(1), r_c(2)) \leq C_{ML\text{-}SIC(1)} \quad [21]$$

where $C_{ML\text{-}SIC(1)}$ represents the MIMO channel capacity, which is computed based on the computed mutual information value $C_{ML\text{-}SIC(1)}$. In other words, the processor 312 may adjust coding rate values $r_{c(1)}$ and/or $r_{c(2)}$ such that the aggregate data transfer rate for signals transmitted by the MIMO transmitter 102, $C_{TX}(r_c(1), r_c(2))$, does not exceed the channel capacity value, $C_{ML\text{-}SIC(1)}$, which is computed based on the computed joint mutual information value $I_{ML\text{-}SIC(1)}$.

In an exemplary embodiment of the invention, the processor 312 may increase the coding rates $r_{c(1)}$ and/or $r_{c(2)}$ based on the condition presented in equation [21]. In an exemplary embodiment of the invention, the processor 312 may decrease the coding rates $r_c(1)$ and/or $r_c(2)$ based on the condition presented in equation [21]. In an exemplary embodiment of the invention, the processor 312 may increase one of the coding rates $r_c(1)$ and $r_c(2)$ while decreasing the other one of the coding rates $r_c(1)$ and $r_c(2)$ based on the condition presented in equation [21].

Another embodiment of the invention may provide a computer readable medium having stored thereon, a computer program having at least one code section executable by a computer, thereby causing the computer to perform steps as described herein for predicting channel quality index (CQI) values for maximum likelihood (ML) detection in a 2×2 multiple input multiple output (MIMO) wireless system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information is in a wireless communication system, the method comprising:
    performing by one or more processors and/or circuits in a multiple input multiple output receiver system that utilizes maximum likelihood detection:
    computing a channel realization matrix based on a plurality of spatial stream signals that are concurrently received via a plurality of receiving antennas; computing a plurality of channel quality index values based on said computed channel realization matrix, the plurality of channel quality index values including a first channel quality index value and a subsequent channel quality index value, wherein: the first channel quality index value is computed, at least in part, by generating a singular value decomposition of the channel realization matrix, and
    the subsequent channel quality index value is computed based upon a symmetrical relationship between the first channel quality index value and the subsequent channel quality index value; and
    selecting one or more coding rates based on said computed plurality of channel quality index values.

2. The method according to claim 1, comprising computing one or more singular values based on said computed channel realization matrix.

3. The method according to claim 2, comprising computing at least one of said plurality of channel quality index values based on said computed one or more singular values.

4. The method according to claim 1, comprising selecting said one or more coding rates and/or one or more modulation types from a lookup table based on said computed plurality of channel quality index values.

5. The method according to claim 1, comprising generating a plurality of simulation channel realization matrices for a simulated multiple input multiple output receiver system, wherein said simulated multiple input multiple output receiver system is based on said multiple input multiple output receiver system.

6. The method according to claim 5, comprising generating a simulated plurality of spatial stream signals based on said generated plurality of simulation channel realization matrices and/or one or more selected coding rates, wherein said generated simulated plurality of spatial stream signals are received by said simulated multiple input multiple output receiver system.

7. The method according to claim 6, comprising computing a plurality of error rate statistic values corresponding to a selected one of said generated simulated plurality of spatial stream signals.

8. The method according to claim 7, comprising selecting a corresponding one or more signal to noise ratio values for each of said computed plurality of error rate statistic values.

9. The method according to claim 8, comprising identifying a corresponding one of said generated plurality of simulation channel realization matrices for each of said computed plurality of error rate statistic values.

10. The method according to claim 9, comprising correlating each of said selected corresponding one or more signal to noise ratio values to said corresponding one of said generated plurality of simulation channel realization matrices.

11. The method according to claim 10, comprising generating a plurality of tuples based on said correlated each of said selected corresponding one or more signal to noise ratio values to said corresponding one of said generated plurality of simulation channel realization matrices.

12. The method according to claim 11, comprising computing a reverse mapping function based on said generated plurality of tuples and radial basis function network computations.

13. The method according to claim 1, comprising concurrently receiving a subsequent plurality of spatial stream signals, wherein said received subsequent plurality of spatial stream signals comprise information that is encoded based on said selected one or more coding rates.

14. A system for communicating information in a wireless communication system, the system comprising:
    one or more circuits for use in a receiver, said one or more circuits are operable for computing a channel realization matrix based on a plurality of spatial stream signals that are concurrently received via a plurality of receiving antennas;

said one or more circuits are operable for computing a plurality of channel quality index values based on said computed channel realization matrix, the plurality of channel quality index values including a first channel quality index value and a subsequent channel quality index value, wherein:

the first channel quality index value is computed, at least in part, by generating a singular value decomposition of the channel realization matrix, and the subsequent channel quality index value is computed based upon a symmetrical relationship between the first channel quality index value and the subsequent channel quality index value; and said one or more circuits are operable for selecting one or more coding rates based on said computed plurality of channel quality index values.

15. The system according to claim 14, wherein said one or more circuits are operable for computing one or more singular values based on said computed channel realization matrix.

16. The system according to claim 15, wherein said one or more circuits are operable for computing at least one of said plurality of channel quality index values based on said computed one or more singular values.

17. The system according to claim 14, wherein said one or more circuits are operable for selecting said one or more coding rates and/or one or more modulation types from a lookup table based on said computed plurality of channel quality index values.

18. The system according to claim 14, wherein said one or more circuits are operable for generating a plurality of simulation channel realization matrices for a simulated multiple input multiple output receiver system, wherein a simulated multiple input multiple output receiver system is based on said multiple input multiple output receiver system.

19. The system according to claim 18, wherein said one or more circuits are operable for generating a simulated plurality of spatial stream signals based on said generated plurality of simulation channel realization matrices and/or one or more selected coding rates, wherein said generated simulated plurality of spatial stream signals are received by said simulated multiple input multiple output receiver system.

20. The system according to claim 19, wherein said one or more circuits are operable for computing a plurality of error rate statistic values corresponding to a selected one of said generated simulated plurality of spatial stream signals.

21. The system according to claim 20, wherein said one or more circuits are operable for selecting a corresponding one or more signal to noise ratio values for each of said computed plurality of error rate statistic values.

22. The system according to claim 21, wherein said one or more circuits are operable for identifying a corresponding one of said generated plurality of simulation channel realization matrices for each of said computed plurality of error rate statistic values.

23. The system according to claim 22, wherein said one or more circuits are operable for correlating each of said selected corresponding one or more signal to noise ratio values to said corresponding one of said generated plurality of simulation channel realization matrices.

24. The system according to claim 23, wherein said one or more circuits are operable for generating a plurality of tuples based on said correlated each of said selected corresponding one or more signal to noise ratio values to said corresponding one of said generated plurality of simulation channel realization matrices.

25. The system according to claim 24, wherein said one or more circuits are operable for computing a reverse mapping function based on said generated plurality of tuples and radial basis function network computations.

26. The system according to claim 14, wherein said one or more circuits are operable for concurrently receiving a subsequent plurality of spatial stream signals, wherein said received subsequent plurality of spatial stream signals comprise information that is encoded based on said selected one or more coding rates.

27. A method for communicating information in a wireless communication system, the method comprising:

performing by one or more processors and/or circuits in a multiple input multiple output receiver system that utilizes maximum likelihood detection:

concurrently receiving a plurality of spatial stream signals via a plurality of receiving antennas;

detecting one of said received plurality of spatial stream signals;

detecting a subsequent one of said received plurality of spatial stream signals based on successive interference cancellation of said detected one of said received plurality of spatial stream signals;

computing a joint mutual information value based on said detected one of said received plurality of spatial stream signals and said detected subsequent one of said received plurality of spatial stream signals;

selecting one or more coding rates based on said computed joint mutual information value;

transmitting said selected one or more coding rates via one or more transmitting antennas; and concurrently receiving a subsequent plurality of spatial stream signals, wherein said received subsequent plurality of spatial stream signals comprise information that is encoded based on said selected one or more coding rates.

28. The method according to claim 27, comprising computing a Shannon upper limit mutual information value for said detected one of said received plurality of spatial stream signals.

29. The method according to claim 28, comprising computing a matched filter mutual information value based on a generated matched filter that is utilized for detection of said received plurality of spatial stream signals.

30. The method according to claim 29, comprising computing said joint mutual information value by subtracting said computed matched filter mutual information value from said Shannon upper limit mutual information value.

* * * * *

UNITED STATES PATENT AND TRADEMARK OFFICE
CERTIFICATE OF CORRECTION

PATENT NO. : 8,472,543 B2  Page 1 of 1
APPLICATION NO. : 12/430286
DATED : June 25, 2013
INVENTOR(S) : Ariyavisitakul et al.

It is certified that error appears in the above-identified patent and that said Letters Patent is hereby corrected as shown below:

Title Page, Item [74] Attorney, Agent or Firm: delete "Garlock" and insert --Garlick--

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,472,543 B2  
APPLICATION NO. : 12/430286  
DATED : June 25, 2013  
INVENTOR(S) : Ariyavisitakul et al.

Page 1 of 1

It is certified that error appears in the above-identified patent and that said Letters Patent is hereby corrected as shown below:

In the Claims

Col. 17, line 55, claim 1: after "communicating information" delete "is"

Signed and Sealed this
Twenty-sixth Day of August, 2014

Michelle K. Lee
*Deputy Director of the United States Patent and Trademark Office*